(12) United States Patent
Mukherjee et al.

(10) Patent No.: US 11,176,055 B1
(45) Date of Patent: Nov. 16, 2021

(54) MANAGING POTENTIAL FAULTS FOR SPECULATIVE PAGE TABLE ACCESS

(71) Applicant: Marvell International Ltd., Hamilton (BM)

(72) Inventors: Shubhendu Sekhar Mukherjee, Southborough, MA (US); David Albert Carlson, Haslet, TX (US); Michael Bertone, Marlborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 171 days.

(21) Appl. No.: 16/532,654

(22) Filed: Aug. 6, 2019

(51) Int. Cl.
  *G06F 12/1009* (2016.01)
  *G06F 12/1045* (2016.01)
  *G06F 9/30* (2018.01)
  *G06F 9/38* (2018.01)

(52) U.S. Cl.
  CPC ...... *G06F 12/1009* (2013.01); *G06F 9/30043* (2013.01); *G06F 9/30047* (2013.01); *G06F 9/30196* (2013.01); *G06F 9/3836* (2013.01); *G06F 12/1063* (2013.01); *G06F 2212/1021* (2013.01)

(58) Field of Classification Search
  CPC ............. G06F 12/1009; G06F 9/30043; G06F 9/30047; G06F 9/30196; G06F 9/3836; G06F 12/1063; G06F 2212/1021
  See application file for complete search history.

(56) References Cited

U.S. PATENT DOCUMENTS

| | | | |
|---|---|---|---|
| 5,442,757 A | 8/1995 | McFarland et al. | |
| 5,539,911 A | 7/1996 | Nguyen et al. | |
| 5,564,111 A | 10/1996 | Glew et al. | |
| 5,613,083 A | 3/1997 | Glew et al. | |
| 5,680,565 A | 10/1997 | Glew et al. | |
| 5,778,219 A | 7/1998 | Amerson et al. | |
| 5,915,117 A | 6/1999 | Ross et al. | |
| 5,956,753 A | 9/1999 | Glew et al. | |
| 6,490,654 B2 | 12/2002 | Wickeraad et al. | |
| 6,775,747 B2 | 8/2004 | Venkatraman | |
| 7,406,581 B2 | 7/2008 | Southwell | |
| 9,081,706 B2 | 7/2015 | Koka et al. | |
| 9,405,702 B2 | 8/2016 | Mukherjee et al. | |
| 9,779,028 B1 | 10/2017 | Mukherjee et al. | |
| 10,223,279 B2 | 3/2019 | Mukherjee et al. | |

(Continued)

*Primary Examiner* — Farley Abad
*Assistant Examiner* — Richard B Franklin
(74) *Attorney, Agent, or Firm* — Young Basile Hanlon & MacFarlane, P.C.

(57) ABSTRACT

A pipeline in a processor core includes: at least one stage that decodes instructions including load instructions that retrieve data stored at respective virtual addresses, at least one stage that issues at least some decoded load instructions out-of-order, and at least one stage that initiates at least one prefetch operation. Copies of page table entries mapping virtual addresses to physical addresses are stored in a TLB. Managing misses in the TLB includes: handling a load instruction issued out-of-order using a hardware page table walker, after a miss in the TLB, handling a prefetch operation using the hardware page table walker, after a miss in the TLB, and handling any software-calling faults triggered by out-of-order load instructions handled by the hardware page table walker differently from any software-calling faults triggered by prefetch operations handled by the hardware page table walker.

22 Claims, 3 Drawing Sheets

(56) References Cited

U.S. PATENT DOCUMENTS

| | | |
|---|---|---|
| 2004/0123081 A1 | 6/2004 | Knies et al. |
| 2013/0159679 A1* | 6/2013 | McCormick, Jr. .. G06F 9/30043 |
| | | 712/220 |
| 2014/0208075 A1 | 7/2014 | McCormick, Jr. |

* cited by examiner

MANAGING POTENTIAL FAULTS FOR SPECULATIVE PAGE TABLE ACCESS

BACKGROUND

The invention relates to managing potential faults for speculative page table access.

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

In one aspect, in general, an integrated circuit includes: at least one processor core executing instructions in a pipeline, wherein the pipeline includes: at least one stage that decodes instructions including load instructions that retrieve data stored at respective virtual addresses included in the load instructions, at least one stage that issues at least some decoded load instructions out-of-order according to a program order, and at least one stage that initiates at least one prefetch operation to retrieve data stored at a virtual address that is not included in any of the load instructions that have been decoded and are waiting to issue before a clock cycle in which the prefetch operation is initiated; a translation lookaside buffer (TLB) in the processor core storing copies of page table entries mapping virtual addresses to physical addresses; and circuitry configured to manage misses in the TLB. The managing includes: handling a load instruction issued out-of-order using a hardware page table walker, after a miss in the TLB for a virtual address targeted by the load instruction, handling a prefetch operation using the hardware page table walker, after a miss in the TLB for a virtual address targeted by the prefetch operation, and handling any software-calling faults triggered by out-of-order load instructions handled by the hardware page table walker differently from any software-calling faults triggered by prefetch operations handled by the hardware page table walker.

In another aspect, in general, a method includes: executing instructions in a pipeline of a processor core, wherein the pipeline includes: at least one stage that decodes instructions including load instructions that retrieve data stored at respective virtual addresses included in the load instructions, at least one stage that issues at least some decoded load instructions out-of-order according to a program order, and at least one stage that initiates at least one prefetch operation to retrieve data stored at a virtual address that is not included in any of the load instructions that have been decoded and are waiting to issue before a clock cycle in which the prefetch operation is initiated; storing copies of page table entries mapping virtual addresses to physical addresses in a translation lookaside buffer (TLB) in the processor core; and managing misses in the TLB. The managing includes: handling a load instruction issued out-of-order using a hardware page table walker, after a miss in the TLB for a virtual address targeted by the load instruction, handling a prefetch operation using the hardware page table walker, after a miss in the TLB for a virtual address targeted by the prefetch operation, and handling any software-calling faults triggered by out-of-order load instructions handled by the hardware page table walker differently from any software-calling faults triggered by prefetch operations handled by the hardware page table walker.

Aspects can include one or more of the following features.

Handling any software-calling faults triggered by out-of-order load instructions handled by the hardware page table walker differently from any software-calling faults triggered by prefetch operations handled by the hardware page table walker includes: terminating execution of the prefetch operations and preventing software handling of any software-calling faults triggered by the prefetch operations, and delaying execution of the out-of-order load instructions until the delayed load instructions can continue execution in-order.

Delaying execution of the out-of-order load instructions until the delayed load instructions can continue execution in-order includes: storing information associated with any software-calling fault triggered by a delayed load instruction for access when the delayed load instruction continues execution.

Terminating execution of the prefetch operations is performed at a first point in a page table walk, and delaying execution of the out-of-order load instructions is performed at a second point in a page table walk, where the first point is earlier in a page table walk than the second point.

The page table structure stores the page table entries outside the processor core.

The processor core includes a page table cache storing a copy of a portion of the page table structure inside the processor core.

The hardware page table walker is configured to access the page table cache before accessing the page table structure in response to a miss in the TLB.

The first point in the page table walk occurs after access of the page table cache and before access of the page table structure outside the processor core.

The second point in the page table walk occurs after access of the page table structure outside the processor core.

A page table entry most recently accessed in the TLB or page table cache in response to a prefetch operation or an out-of-order load operation is marked for replacement before at least some page table entries most recently accessed in the TLB or page table cache in response to an in-order load operation.

The hardware page table walker includes at least some circuitry within the processor core.

Aspects can have one or more of the following advantages.

Some actions that are performed as part of managing instruction execution have a potential to cause delays in one or more pipeline stages. For example, actions associated with translation of virtual addresses to physical addresses may lead to a software-calling fault that may cause a significant delay. A software-calling fault may include any fault that disrupts a stream of instructions being executed in the pipeline in order to execute different instructions for handling the fault "in software," as described in more detail below. Such disruptions may be particularly problematic if the action that led to the software-calling fault was "speculative" in nature.

In some situations, speculative actions can enhance performance of a pipeline by enabling certain work that will potentially be required for instruction execution to be performed before it is confirmed that the work is actually required. For successful speculation, the head start in performing the work reduces pipeline delays. For unsuccessful speculation, the head start in performing the work may be wasted. Such wasted effort may still be worthwhile if the success rate is high enough. But, when speculative actions cause other actions that bring significant delays, such as handling of a software-calling fault, the benefits of speculation are less certain.

Certain speculative actions that may trigger a software-calling fault involve accessing a page table cache. For example, access to the page table cache may be required when executing speculative load instructions or when performing speculative prefetch operations. Such software-calling faults may include page faults (e.g., a miss in the page table), access violation faults (e.g., an attempt to write to a memory page that is configured for read-only access), or permission faults (e.g., an attempted access at an insufficient permission level, also called an exception level), for example. Some of the techniques described herein are able to avoid such software-calling faults from actually calling software in response to a speculative action, or are able to ensure that software is called only after the action that caused the fault is confirmed (and is thus no longer "speculative").

One of the potential advantages of this ability to avoid detrimental effects on performance of software-calling faults for address translation is that speculative actions that involve address translation can proceed further than they otherwise would. For example, without such an ability, it may be necessary to pause speculative address translation at an earlier phase at which software-calling faults are not possible, such as right after a TLB lookup miss. Instead, for some instructions, after a miss in the TLB, speculative address translation can proceed to perform a speculative page table walk that starts by speculatively accessing the page table cache without the danger that a software-calling fault will overwhelm the potential performance benefit. Since a page table maps an entire address space, its structure is typically more complex, and requires much more storage space, than the structure of a TLB. While the page table cache may be stored on-chip within a processor core, along with the TLB, the operation of walking the structure of a page table cache and the potential for various kinds of faults, including software-calling faults, makes a speculative page table walk more unpredictable than a speculative TLB lookup. This ability to proceed further in speculative address translation brings potential increases in the performance benefits of speculation. Also, there is added flexibility and efficiency in the ability to handle any software-calling faults triggered by out-of-order load instructions differently from any software-calling faults triggered by prefetch operations, as described in more detail below.

Other features and advantages of the invention will become apparent from the following description, and from the claims.

DESCRIPTION

Figure 1:
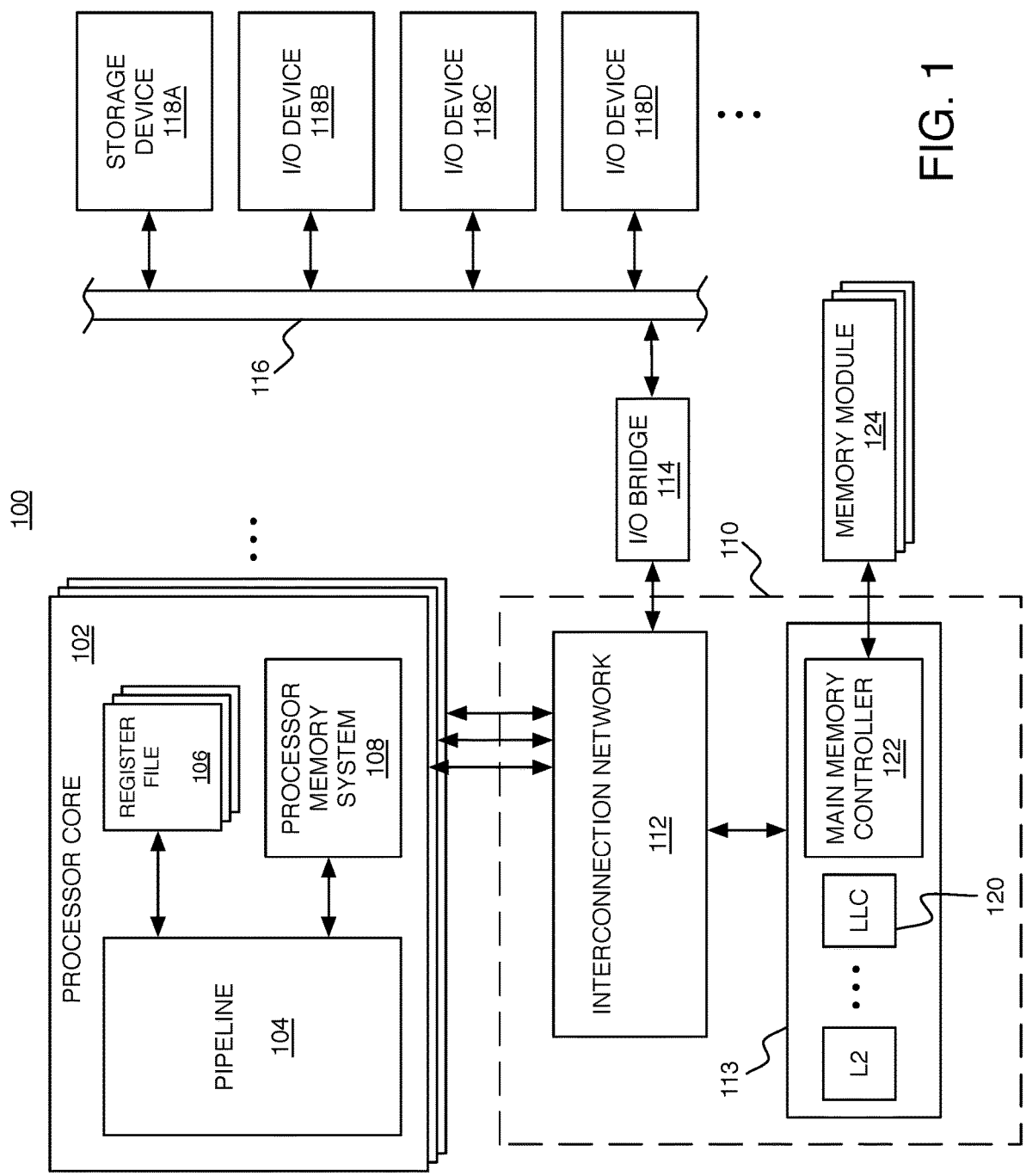
FIG. 1 is a schematic diagram of a computing system.

FIG. 1 shows an example of a computing system 100 in which the techniques described herein can be used. The system 100 includes at least one processor core 102, which could be a single central processing unit (CPU), or one of multiple processor cores in a multi-core architecture, where each processor core (or each "core") comprises an individual CPU with associated circuitry. In this example of a multi-core architecture, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. Some stages occur in a front-end portion of the pipeline. An instruction is fetched (e.g., in an instruction fetch (IF) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time). An instruction is then decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction is then ready to be issued. Issuing an instruction starts progression of the instruction through stages in a back-end portion of the pipeline to execute the instruction. Execution may involve applying the instruction's operation to its operand(s) to produce a result for an arithmetic logic unit (ALU) instruction, storing or loading to or from a memory address for a memory instruction, or may involve evaluating a condition of a conditional branch instruction to determine whether or not the branch will be taken. After an instruction has completed execution, the instruction can be committed so that any effect of the instruction is made globally visible to software. Committing an instruction may involve storing a result in a register file (e.g., in a write back (WB) stage or stages), for example. In most implementations, even if any instructions were issued out-of-order, all instructions are generally committed in-order.

Figure 2:
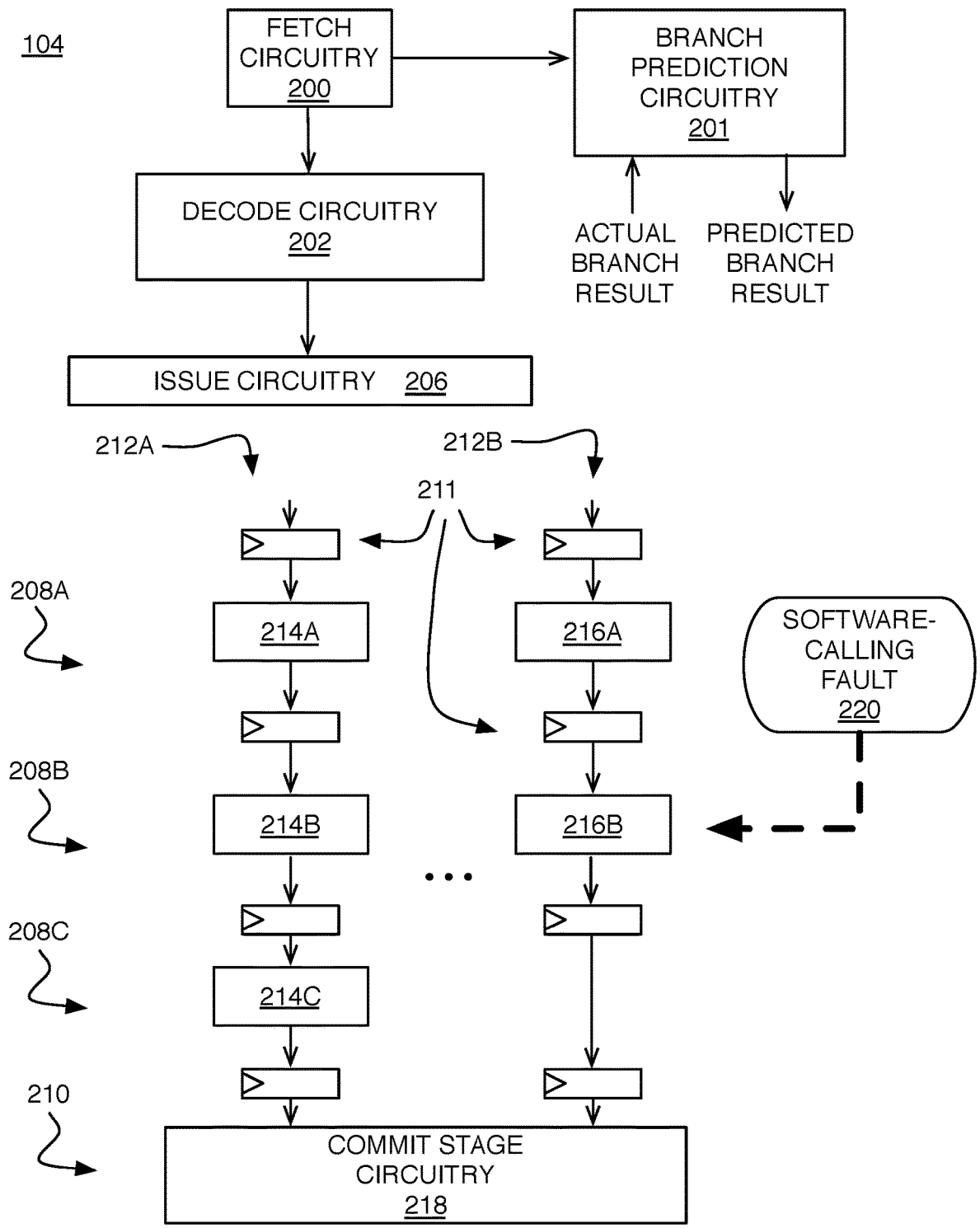
FIG. 2 is a schematic diagram of a processor core pipeline.

FIG. 2 shows an example in which the pipeline 104 is configured to efficiently handle software-calling faults, as will be described in more detail below. The pipeline 104 includes circuitry for the various stages. For one or more instruction fetch stages, instruction fetch circuitry 200 provides a PC to an instruction cache in the processor memory system 108 (FIG. 1) to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions. The branch prediction circuitry 201 also stores branch history information that is updated based on a received actual branch result. In some implementations, some or all of the branch prediction circuitry 201 is considered part of the fetch circuitry 200. For one or more instruction decode stages, instruction decode circuitry 202 stores information in an issue queue for instructions in the instruction window waiting to be issued.

Issue circuitry 206 determines in which cycle each of the instructions in the issue queue are to be issued, which makes them available to progress through circuitry of the execution stages 208A, 208B, and 208C of the pipeline 104. (For simplicity, this example has three execution stages, but other examples may have more or fewer execution stages.) There is also at least one commit stage 210 that commits results of instructions that have made their way through the execution stages 208A, 208B, and 208C. For example, commit stage circuitry 218 may write back a result into a register file 106 (FIG. 1). However, some instructions may not be committed by the commit stage circuitry 218, but may instead be committed by other circuitry, such as circuitry in another stage of the back-end or a stage of the front-end, possibly based on information from the commit stage.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path (212A) may include circuitry for executing instructions using units for various operations (e.g., ALU, multiplier, floating point unit), and another path (212B) may include circuitry for executing memory access instructions, including load instructions that read data values from the memory system, and store instructions to write data values to the memory system. The functional circuitry 216B may be configured to handle a software-calling fault 220 that is triggered at some point when attempting to handle a memory access.

Figure 3:
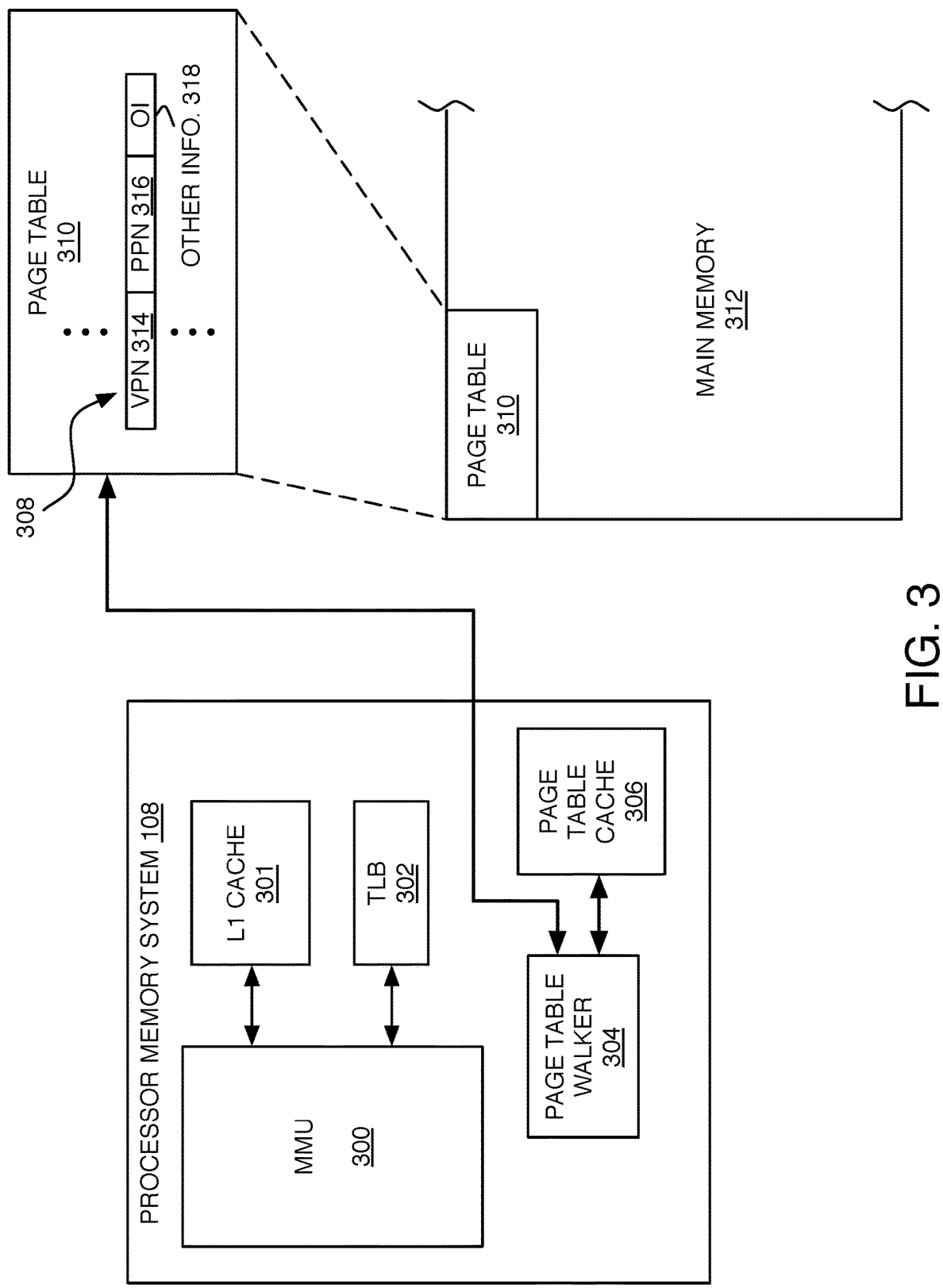
FIG. 3 is a schematic diagram of a portion of a processor memory system.

Referring to FIG. 3, the circuitry for executing memory access instructions may communicate with circuitry in the processor memory system 108, such as a memory management unit (MMU) 300, which manages memory access functions including potential translation of virtual addresses to physical addresses. For example, the MMU 300 determines whether a copy of a stored value (e.g., data or an instruction) at a given virtual address is present in any of the levels of the hierarchical cache system, from an L1 cache 301 up to the LLC 120 (FIG. 1) if necessary. If so, then the instruction accessing that virtual address can be handled using the cache system. If not, then that instruction can be handled after accessing the value from main memory.

The main memory, and potentially one or more levels of the cache system, may need to be accessed using a physical address (PA) translated from the virtual address (VA). So, the processor memory system 108 also includes a TLB 302, a page table walker 304, and a page table cache 306. Both the TLB 302 and the page table cache 306 store information that provides a VA-to-PA mapping that is based on information in a page table entry (PTE) 308 of a page table 310. The page table 310 is typically an operating system or software structure, which maintains address translation between address spaces. A typical address translation mechanism is from a virtual address to a physical address. Alternatively, in systems with virtual machines, a virtual address may first be translated to an intermediate physical address. The intermediate physical address may then be translated to a physical address based on PTEs stored in a different page table.

The page table 310 can be implemented as a multi-level structure that stores PTEs that represent a complete set of VA-to-PA mappings for virtual memory addresses that currently reside in physical memory. The page table 310 is typically stored in main memory 312 along with physical memory pages that represent corresponding mapped virtual memory pages that have been "paged in" from secondary storage (e.g., storage device 118A). Alternatively, in some implementations, the page table 310 may be stored in the LLC 120. There are typically multiple page tables, with a separate page table corresponding to each process, where each process has its own address space (e.g., identified by an address space identifier (ASID) and potentially other context information). Whenever there is a context switch between different processes, a pointer stored in a register in the processor core 102 may be updated to point to the base of the appropriate page table.

The TLB 302 is used for caching recently used PTEs from the page table 310. The TLB 302 may be implemented in any of a variety of cache structures, including multiple levels of cache structure (e.g., a small L1 TLB, sometimes called a "micro TLB" and a larger L2 TLB). This enables the translation to be performed in response to a load or store instruction, for example, without the page table walker 304 having to perform a more extensive lookup to retrieve a PTE. In this example, a PTE 308 of the page table 310 stores a virtual page number 314 and a physical page number 316, which serve as a mapping between a VA and a PA that defines a translation of that VA. The low order bits consisting of the page offsets are identical for a VA and its mapped PA, which leaves the high order bits consisting of the page numbers to specify the mapping. The PTE 308 also includes other information (OI) 318, such as information indicating whether or not the page is resident in main memory 312 or needs to be retrieved from secondary storage, and information indicating permissions and other access rules. When the PTE 308 is stored in an entry of the TLB 302, there is also information in the TLB for managing the transfer of PTEs between the page table 310 and the TLB 302, and for invalidating PTEs in the TLB 302 (e.g., by toggling a valid bit). If an entry in the TLB 302 is found that matches with a portion of a VA to be translated (i.e., a "TLB hit"), then the PTE stored in that entry is used for translation. If there is no match (i.e., a "TLB miss"), then the page table walker 304 traverses (or "walks") the potentially multi-level arrangement of data structures (e.g., a hierarchical tree of data structures) forming the page table 310 to find a PTE for determining the physical memory address associated with the virtual memory address.

These stages of address translation performed by the page table walker 304 are called a "page table walk." In some processor configurations it is possible to implement a page table walker in software, but in this example, the page table walker 304 is implemented in hardware, residing within the processor memory system 108 of a given processor core and directly accessible to stages in the back-end of the pipeline. A speculative page table walk, which occurs when the associated address translation is being performed for a speculative action, may proceed with several stages before potentially triggering a software-calling fault. For example, in some implementations, a page table walk starts by the page table walker 304 attempting to retrieve a PTE from the page table cache 306. If no PTE is found in the page table cache 306, then the page table walker 304 continues to walk the levels of the page table to determine the physical memory address associated with the virtual memory address. If the page table walker 304 does not find a PTE in the page table after completing a full page table walk, one kind of software-calling fault, referred to as a "page fault," is raised, which would typically be followed by a call to software for handling the page fault. The actions that would be performed "in software," by executing appropriate instructions within the pipeline, include determining a translation and generating a PTE for that translation that is added to the page table 310. The procedures for ensuring that potential software-calling faults are handled appropriately for speculative actions may depend on the kind of speculation that is being performed.

One kind of speculation that may be performed in the pipeline 104 is a prefetch operation. Generally, a prefetch operation is a type of memory access that attempts to predict a future memory access based on a predicted access pattern. The prefetch operation is used to preload a cache level (e.g., of a data cache) so that the future memory access request will hit in that cache level instead of having to access a higher cache level or a main memory. Some prefetch operations are associated with a stream, which occurs when there is a sequence of multiple memory access requests for values, where the virtual address offset between adjacent values in the stream (called the "stride") is fixed that may be learned after one or more prefetched values have been successfully predicted. Some processors may be configured to perform prefetching for multiple separate, independent streams.

Since consequences of a failed prefetch operation may be minimal, a prefetch operation can be canceled at an early stage of a page table walk to avoid a software-calling fault from being triggered. For example, if the page table walker 304 encounters a miss in an attempted access of the page table cache 306, the prefetch operation that is being performed can be canceled. If the page table walker 304 encounters a hit an attempted access of the page table cache 306, the address translation can be completed, but the prefetch operation may still be canceled. For example, if a software-calling fault is triggered due to an access violation fault or a permission fault, the prefetch operation can be canceled. Alternatively, instead of canceling a prefetch operation in response to a miss in the page table cache 306, the prefetch operation can be canceled earlier after a miss in the TLB 302, or can be canceled later by proceeding with the page table walk and only be canceled in the event that an actual software-calling fault is triggered. A prefetch operation may be initiated from a given pipeline stage based on hardware or software prefetch schemes. Typically, in the clock cycle in which a given prefetch operation has been initiated, the virtual address that is being retrieved by that prefetch operation is not an address that already being loaded by the software program, in which case the virtual address being retrieved is not included in any of the load instructions that have been decoded and are waiting to issue before the clock cycle in which the prefetch operation is initiated.

Another kind of speculation that may be performed in the pipeline 104 is speculative execution of a memory access instruction (e.g., a load or store instruction). In some processors, only some kinds of memory access instruction are permitted to be speculatively issued out-of-order from a program order (e.g., earlier than they would have been executed in the program order). For example, load instructions may be permitted to be issued out-of-order while store instructions may be required to be issued in program order (e.g., for efficient handling of memory barrier instructions). In the following examples, speculative execution of load instructions will be considered.

A stage in the back-end may be configured to notify a stage in the front-end in the event of a fault. If an attempted execution of a load instruction results in a miss in the page table cache 306, the page table walker 304 will proceed to access the page table 310, which may result in a page fault due to a miss in the page table 310. Otherwise, even if there is a hit in the page table cache 306, or a hit in the page table 310, there may be another kind of fault (e.g., an access violation fault or a permission fault). The notification to the front-end of any of these potential faults may be needed, for example, since the back-end of the pipeline does not necessarily have any indication that a particular load instruction has been speculatively issued out-of-order. The back-end may also send the front-end state information associated with a particular fault.

The front-end is able to determine whether software would need to be called to handle any particular fault (and thus whether that fault is a software-calling fault). If software would not need to be called, then the fault can be handled in hardware. If software would need to be called, then the software-calling fault can determine if the action that triggered the software-calling fault was speculative, and if so take appropriate action depending on the type of speculation being performed. For example, any software-calling faults triggered by out-of-order load instructions may be handled differently from any software-calling faults triggered by prefetch operations. For a prefetch operation, the front-end can terminate execution of the prefetch operation and prevent software handling of the software-calling fault. For a speculative load instruction issued out-of-order, the front-end can delay execution of the load instruction until the load instruction can continue in-order.

For example, in some implementations, the load instruction can proceed in-order after all instructions preceding the load instruction in program order have been committed. In other implementations, the load instruction can be delayed longer and can proceed after all instructions preceding the load instruction in program order have been issued. If the delayed load instruction is reached (i.e., pointed to by the program counter) as the next instruction to be committed (or issued) in program order, the load instruction may resume from an associated state at the time it was delayed (e.g., using information associated with the software-calling fault stored in a register or other local storage accessible within the pipeline), or the load instruction may be reissued. However, it is possible that the delayed load instruction will not be reached, since it was speculatively issued out-of-order and an in-order execution may not have caused that particular load instruction to actually be executed. In that case, it the delayed load instruction may simply be discarded without consequences.

Another aspect of managing translation in the context of speculative actions is managing the replacement policy of various caching data structures such as the TLB 302 and the page table cache 306. For example, the replacement policy can depend on whether a given access is speculative or not. This dependence may apply to the entire data structure or may be limited to one or more predetermined levels (e.g., only L1, or both L1 and L2) of a hierarchical caching data structure. If an entry added to the data structure as a result of performing address translation for a speculative load or prefetch, for example, then the entry can be marked for prioritized eviction and replacement with respect to a default policy, such that it is evicted and replaced with a new entry earlier than other entries (e.g., entries that may have been more recently accessed, but were accessed in response to non-speculative memory accesses, such as an in-order load operation). If a translation performed for a subsequent action (either speculative or non-speculative) results in a hit on that prioritized entry, then the entry can be unmarked so that it is no longer marked for prioritized eviction and replacement and is replaced according to the default policy. This prioritized replacement may be helpful, for example, to reduce potential pollution of the caching data structure with speculative entries.

Various alternative techniques can be used, and potentially combined with the techniques described above. For example, in some implementations, instead of storing a full PTE, the page table cache 306 can be configured to store partial information that can be used to reduce the time needed to perform a full walk of the page table, as described in more detail, for example, in U.S. Pat. No. 9,405,702, entitled "CACHING TLB TRANSLATIONS USING A UNIFIED PAGE TABLE WALKER CACHE," incorporated herein by reference.

Some techniques for accessing caches using virtual addresses depend on page size. Various processor architectures support multiple page sizes. For example, there may be 9 different pages sizes, where the smallest page size is 4 KB and the largest page size is 4 TB. When the page size changes, so does the number of bits of the virtual address that are used for the page offset (the lowest order bits) and the number of bits of the virtual address that are used for the virtual page number (the remaining high order bits). Examples of techniques for handling page sizes can be found, for example, in U.S. Pat. No. 10,223,279, entitled "MANAGING VIRTUAL-ADDRESS CACHES FOR MULTIPLE PAGE SIZES," incorporated herein by reference. Note that, in some implementations, the terms "block" and "block size" are used to refer to the addressable chunks of memory in a processor architecture instead of "page" and "page size", and the term "page" is instead reserved for a unit of memory that may be determined by software, where (potentially complex) pages can be created out of multiple blocks. As used herein, the terms "page" and "page size" will refer to portions of memory addressed by virtual and physical addresses according to a processor architecture.

When establishing a translation from a particular virtual address to a particular physical address or intermediate physical address, various types of context information may be used to distinguish otherwise identical virtual addresses from each other. This enables multiple independent virtual address spaces to exist for different processes or different virtual machines or any of a variety of other differentiating characteristics that support different virtual address spaces. Various portions of the context information can be used for differentiating between virtual addresses that are in use within different VA-to-PA translations, or if intermediate physical addresses (IPAs) are used, VA-to-IPA translations, or IPA-to-PA translations. For example, an operating system may use an address space identifier (ASID) (e.g., 16 bits) to identify a memory space (a virtual address space) associated with a running process. A hypervisor may use a virtual machine identifier (VMID) (e.g., 16 bits) to identify a memory space (intermediate physical address space) associated with a guest operating system of a virtual machine. Certain parameters may be associated with different classes of processes or software environments that are available in an architecture, such as a security state with values of secure (S) or non-secure (NS), or an exception level (also called a 'priority level') with values of EL0-EL3 (for a 2-bit exception level), for example. All of this context information together comprises a context (also called a "translation context" or a "software context") for a particular virtual address.

A context identifier (CID) may represent either the full context information or partial context information. In some architectures, for example, the full context information may include 35 bits for: 2-bit exception level (EL), 1-bit non-secure/secure (NS/S) value, 16-bit VMID, and 16-bit ASID. But, there is potentially significant overhead in terms of integrated circuit area devoted to storage for the data structure that tracks validity for different CIDs. To reduce the overhead, the CID can include partial context information, such as only the 16-bit VMID and the 2-bit EL. Such partial context information would uniquely identify different subsets of contexts. Alternatively, instead of simply concatenating subsets of bits from the full context information, techniques can be used to essentially compress full context information into fewer bits. Circuitry that computes the CIDs can be configured to include fewer bits than the full context information, where those bits are assigned based on a stored mapping between CIDs and a corresponding full context information string. While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," incorporated herein by reference.

Other embodiments are within the scope of the following claims.

What is claimed is:
1. An integrated circuit comprising:
at least one processor core executing instructions in a pipeline, wherein the pipeline includes:
at least one stage that decodes instructions including load instructions that retrieve data stored at respective virtual addresses included in the load instructions,
at least one stage that issues at least some decoded load instructions out-of-order according to a program order, and
at least one stage that initiates at least one prefetch operation to retrieve data stored at a virtual address that is not included in any of the load instructions that have been decoded and are waiting to issue before a clock cycle in which the prefetch operation is initiated;
a translation lookaside buffer (TLB) in the processor core storing copies of page table entries mapping virtual addresses to physical addresses; and
circuitry configured to manage misses in the TLB, the managing including:

handling a load instruction speculatively issued out-of-order using a hardware page table walker, after a miss in the TLB for a virtual address targeted by the load instruction,
handling a prefetch operation using the hardware page table walker, after a miss in the TLB for a virtual address targeted by the prefetch operation, and
handling any software-calling faults triggered by speculatively issued out-of-order load instructions handled by the hardware page table walker differently from any software-calling faults triggered by prefetch operations handled by the hardware page table walker.

2. The integrated circuit of claim 1, wherein handling any software-calling faults triggered by speculatively issued out-of-order load instructions handled by the hardware page table walker differently from any software-calling faults triggered by prefetch operations handled by the hardware page table walker includes:
terminating execution of the prefetch operations and preventing software handling of any software-calling faults triggered by the prefetch operations, and
delaying execution of the speculatively issued out-of-order load instructions until the delayed load instructions can continue execution in-order.

3. The integrated circuit of claim 2, wherein delaying execution of the speculatively issued out-of-order load instructions until the delayed load instructions can continue execution in-order includes: storing information associated with any software-calling fault triggered by a delayed load instruction for access when the delayed load instruction continues execution.

4. The integrated circuit of claim 2, wherein terminating execution of the prefetch operations is performed at a first point in a page table walk, and delaying execution of the speculatively issued out-of-order load instructions is performed at a second point in a page table walk, where the first point is earlier in a page table walk than the second point.

5. The integrated circuit of claim 4, wherein the page table structure stores the page table entries outside the processor core.

6. The integrated circuit of claim 5, wherein the processor core includes a page table cache storing a copy of a portion of the page table structure inside the processor core.

7. The integrated circuit of claim 6, wherein the hardware page table walker is configured to access the page table cache before accessing the page table structure in response to a miss in the TLB.

8. The integrated circuit of claim 7, wherein the first point in the page table walk occurs after access of the page table cache and before access of the page table structure outside the processor core.

9. The integrated circuit of claim 8, wherein the second point in the page table walk occurs after access of the page table structure outside the processor core.

10. The integrated circuit of claim 7, wherein a page table entry most recently accessed in the TLB or page table cache in response to a prefetch operation or an out-of-order load operation is marked for replacement before at least some page table entries most recently accessed in the TLB or page table cache in response to an in-order load operation.

11. The integrated circuit of claim 1, wherein the hardware page table walker includes at least some circuitry within the processor core.

12. A method comprising:
executing instructions in a pipeline of a processor core, wherein the pipeline includes:

at least one stage that decodes instructions including load instructions that retrieve data stored at respective virtual addresses included in the load instructions, at least one stage that issues at least some decoded load instructions out-of-order according to a program order, and at least one stage that initiates at least one prefetch operation to retrieve data stored at a virtual address that is not included in any of the load instructions that have been decoded and are waiting to issue before a clock cycle in which the prefetch operation is initiated;

storing copies of page table entries mapping virtual addresses to physical addresses in a translation lookaside buffer (TLB) in the processor core; and managing misses in the TLB, the managing including:

handling a load instruction speculatively issued out-of-order using a hardware page table walker, after a miss in the TLB for a virtual address targeted by the load instruction, handling a prefetch operation using the hardware page table walker, after a miss in the TLB for a virtual address targeted by the prefetch operation, and handling any software-calling faults triggered by speculatively issued out-of-order load instructions handled by the hardware page table walker differently from any software-calling faults triggered by prefetch operations handled by the hardware page table walker.

13. The method of claim 12, wherein handling any software-calling faults triggered by speculatively issued out-of-order load instructions handled by the hardware page table walker differently from any software-calling faults triggered by prefetch operations handled by the hardware page table walker includes:

terminating execution of the prefetch operations and preventing software handling of any software-calling faults triggered by the prefetch operations, and delaying execution of the speculatively issued out-of-order load instructions until the delayed load instructions can continue execution in-order.

14. The method of claim 13, wherein delaying execution of the speculatively issued out-of-order load instructions until the delayed load instructions can continue execution in-order includes: storing information associated with any software-calling fault triggered by a delayed load instruction for access when the delayed load instruction continues execution.

15. The method of claim 13, wherein terminating execution of the prefetch operations is performed at a first point in a page table walk, and delaying execution of the speculatively issued out-of-order load instructions is performed at a second point in a page table walk, where the first point is earlier in a page table walk than the second point.

16. The method of claim 15, wherein the page table structure stores the page table entries outside the processor core.

17. The method of claim 16, wherein the processor core includes a page table cache storing a copy of a portion of the page table structure inside the processor core.

18. The method of claim 17, wherein the hardware page table walker is configured to access the page table cache before accessing the page table structure in response to a miss in the TLB.

19. The method of claim 18, wherein the first point in the page table walk occurs after access of the page table cache and before access of the page table structure outside the processor core.

20. The method of claim 19, wherein the second point in the page table walk occurs after access of the page table structure outside the processor core.

21. The method of claim 18, wherein a page table entry most recently accessed in the TLB or page table cache in response to a prefetch operation or an out-of-order load operation is marked for replacement before at least some page table entries most recently accessed in the TLB or page table cache in response to an in-order load operation.

22. The method of claim 12, wherein the hardware page table walker includes at least some circuitry within the processor core.

* * * * *